(12) United States Patent
Kumawat et al.

(10) Patent No.: US 11,935,064 B2
(45) Date of Patent: Mar. 19, 2024

(54) EXTRA SECURITY ELEMENT ON CARDS TO PROTECT AGAINST FRAUD

(71) Applicant: Mastercard International Incorporated, Purchase, NY (US)

(72) Inventors: Jaipal Singh Kumawat, Sikar (IN); Gurpreet Atwal, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 77 days.

(21) Appl. No.: 17/530,520

(22) Filed: Nov. 19, 2021

(65) Prior Publication Data

US 2022/0156747 A1    May 19, 2022

Related U.S. Application Data

(60) Provisional application No. 63/115,912, filed on Nov. 19, 2020.

(51) Int. Cl.
*G06Q 20/40* (2012.01)
*G06Q 20/34* (2012.01)
*G06Q 20/38* (2012.01)

(52) U.S. Cl.
CPC ....... *G06Q 20/4018* (2013.01); *G06Q 20/341* (2013.01); *G06Q 20/38215* (2013.01); *G06Q 20/4012* (2013.01); *G06Q 20/405* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 6,578,768 B1 * | 6/2003 | Binder | G06K 7/0008 235/492 |
| 6,776,332 B2 * | 8/2004 | Allen | G06Q 40/00 235/382 |
| 7,506,812 B2 | 3/2009 | Von Mueller et al. | |
| 7,580,898 B2 | 8/2009 | Brown et al. | |
| 7,793,845 B2 * | 9/2010 | Bonalle | G06Q 20/105 235/487 |
| 2010/0185545 A1 | 7/2010 | Royyuru et al. | |

(Continued)

*Primary Examiner* — John W Hayes
*Assistant Examiner* — Chenyuh Kuo
(74) *Attorney, Agent, or Firm* — Hovey Williams LLP

(57) ABSTRACT

Authenticating a secure element payment card includes transmitting a cold reset signal to the payment card and receiving an answer-to-reset message therefrom. The answer-to-reset message includes governing rules for performing a transaction, including a rule indicating that a secure data element is to be used to authenticate the payment card. The process also includes receiving payment account details for a payment account associated with the payment card. A payment authorization request message is transmitted to an interchange network and a card authentication request message is then received from the interchange network. The card authentication request message includes an encrypted instruction, which is transmitted to the secure element payment card. The secure data element is received from the payment card and a card authentication request response message is then transmitted to the interchange network. A payment authorization request response message is then received from the interchange network.

14 Claims, 11 Drawing Sheets

(56) References Cited

U.S. PATENT DOCUMENTS

| | | | | |
|---|---|---|---|---|
| 2017/0243198 A1* | 8/2017 | Lee | .................. | G06Q 20/34 |
| 2018/0167208 A1* | 6/2018 | Le Saint | .............. | H04L 9/3273 |
| 2019/0392427 A1* | 12/2019 | Wilson | ............... | G06Q 20/3563 |
| 2020/0202342 A1* | 6/2020 | Thomas | ............. | G06Q 20/4016 |
| 2020/0387888 A1* | 12/2020 | Amiel | ................... | G06Q 20/18 |
| 2021/0133725 A1* | 5/2021 | Mousseau | ............ | G06Q 20/409 |

\* cited by examiner

EXTRA SECURITY ELEMENT ON CARDS TO PROTECT AGAINST FRAUD

CROSS-REFERENCE TO RELATED APPLICATIONS

This application claims the priority benefit of identically-titled U.S. Provisional Patent Application Ser. No. 63/115,912 filed Nov. 19, 2020, the entire disclosure of which is incorporated herein by reference.

FIELD OF THE DISCLOSURE

The field of the disclosure relates generally to a payment card and, more particularly, to a payment card having an access-controlled security element thereon.

BACKGROUND OF THE DISCLOSURE

Typical payment cards have a magnetic strip that includes card details that can be easily "skimmed" and copied to a fraudulent card. To facilitate reducing the ability to skim a payment card and use it to perform fraudulent transactions, EMV, or chip, cards have been introduced. EMV cards include a small computing device capable of running various applications embedded therein.

During use of a typical EMV card, a sequence of steps are performed. The first step is called initialization. During initialization, a transaction terminal (e.g., an ATM, POS terminal, etc.) receives basic information from the EMV card such as cardholder name, card expiration date, and the list of applications the payment card is capable of running. The second step is optional and is called data authentication. The transaction terminal checks if the card is authentic, a process that involves validating the card using cryptographic algorithms. The third is also optional and is called cardholder verification. During this step, the cardholder typically provides a PIN code. The fourth step is the performance of the transaction. Fraudsters can clone EMV cards by taking advantage of the optional steps because these steps, authentication and verification, can be skipped.

It is known that fraudsters have been able to steal EMV card data. The fraudsters can create cloned EMV cards by installing a fraud application onto the chip embedded in the payment card. The fraud application tells the POS terminal there is no need to perform data authentication. That means no cryptographic operations are performed. Therefore, the fraudsters do not need to obtain the private cryptographic keys associated with the payment card data. In addition, the fraud application implements an option in the EMV standard that allows the payment card to be the device that verifies the PIN. As such, the fraudulent application can authenticate the entered PIN, no matter what PIN was entered.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method to authenticate a secure element payment card is provided. The method includes transmitting a cold reset signal to the secure element payment card and receiving an answer-to-reset message from the secure element payment card. The answer-to-reset message includes governing rules for performing a transaction. The governing rules indicate that a secure data element is to be used to authenticate the secure element payment card. The method also includes receiving payment account details for a payment account associated with the secure element payment card and transmitting a payment authorization request message to an interchange network. Furthermore, the method includes receiving a card authentication request message from the interchange network. The card authentication request message includes an encrypted instruction. The method includes transmitting the encrypted instruction to the secure element payment card and receiving the secure data element from the secure element payment card. Moreover, the method includes transmitting a card authentication request response message to the interchange network. The card authentication request response message includes the secure data element. In addition, the method includes, receiving a payment authorization request response message, based on the secure data element, from the interchange network.

In another aspect, a system to authenticate a secure element payment card is provided. The system includes a secure element payment card having a micromodule. The micromodule includes a primary memory component storing payment account details for a payment account, a PIN associated with the payment account, and governing rules for performing a transaction. The governing rules indicate that a secure data element is to be used to authenticate the secure element payment card. The micromodule also includes a secure memory component storing the secure data element, and an electronic switch configured to open and close a circuit coupled to the secure memory component. The system also includes a point-of-sale device having a processor and a payment card reader/writer component. The processor is programmed to transmit a cold reset signal to the micromodule of the secure element payment card and receive an answer-to-reset message from the micromodule. The answer-to-reset message includes the governing rules. The processor is also programmed to receive the payment account details for the payment account and to transmit a payment authorization request message to an interchange network. The processor is programmed to receive a card authentication request message from the interchange network. The card authentication request message includes an encrypted instruction. The processor is further programmed to transmit the encrypted instruction to the micromodule and to receive the secure data element from the micromodule. Moreover, the processor is programmed to transmit a card authentication request response message to the interchange network. The card authentication request response message includes the secure data element. Furthermore, the processor is programmed to receive a payment authorization request response message, based on the secure data element, from the interchange network.

In yet another aspect, a computer-implemented method to update a secure element payment card is provided. The method includes presenting to a cardholder options to update the secure element payment card. The method also includes receiving, from the cardholder, a selection of one of the presented options, and performing one or more operations of the selected option to generate user selected changes to the secure element payment card. In addition, the method includes actuating an electronic switch on the secure element payment card to enable access to a secure memory component, writing the user selected changes to the secure memory component of the secure element payment card, and actuating the electronic switch on the secure element payment card to prevent access to the secure memory component.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Exemplary Secure Element Payment Card

Figure 1:
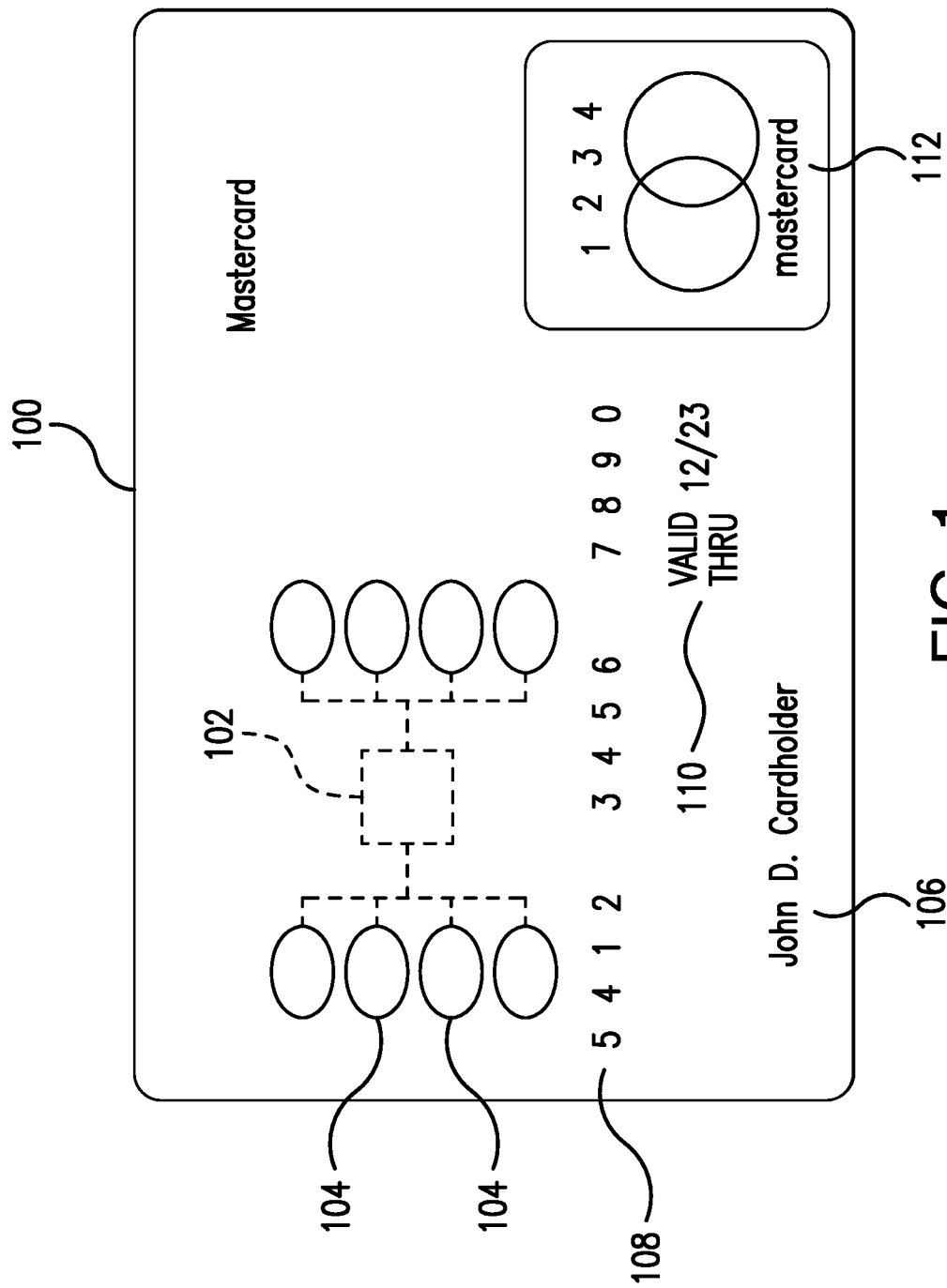
FIG. 1 is a schematic front view of a secure element payment card.

FIG. 1 is a schematic front view of a secure element payment card 100. In the exemplary embodiment, the payment card 100 includes an embedded integrated circuit (IC) or micromodule 102 that stores and transmits transaction data between electronic devices. The micromodule 102 includes a single silicon integrated circuit chip with at least a primary memory component 202 (shown in FIG. 2), an access-controlled secure memory component 222 (shown in FIG. 2), and a processor 204 (shown in FIG. 2). Alternatively, in some embodiments, the micromodule 102 may only include memory with non-programmable logic. In the exemplary embodiment, the transaction data stored on the micromodule 102 is associated with at least one payment account linked to a funding source.

As shown in FIG. 1, the micromodule 102 includes a plurality of electrical contacts 104 for communication between the payment card 100 and a point-of-sale (POS) terminal 506 (shown in FIG. 5), an automated teller machine (ATM) (shown in FIG. 5), and/or any other machine capable of reading and/or writing to the payment card 100 to perform transactions and/or update data, respectively. In the exemplary embodiment, the micromodule 102 includes eight (8) electrical contacts 104. The ISO/IEC 7816-2 standard includes assignments for at least power supply voltage (VCC), reset (RST) used to reset the microprocessor, clock signal (CLK), serial input/output (I/O), and ground (GRD) signals for the electrical contacts 104. In some embodiments, the micromodule 102 may include fewer or more electrical contacts 104.

In the exemplary embodiment, the payment card 100 may be configured as a credit card, a debit card, and/or a stored value card (i.e., a payment card containing monetary value that can be transferred when a cardholder performs a payment transaction). As shown in FIG. 1, the payment card 100 preferably includes a cardholder's name 106 and a logo 112 of a financial company whose services are used by the cardholder (e.g., Mastercard). (Mastercard is a registered trademark of Mastercard International Incorporated.) In addition, the payment card 100 may include a primary account number (PAN) 108 and an expiration date 110. The PAN may correspond to a primary account included in data stored on the payment card 100, for example, in the micromodule 102 and/or the magnetic strip (not shown).

Figure 2:
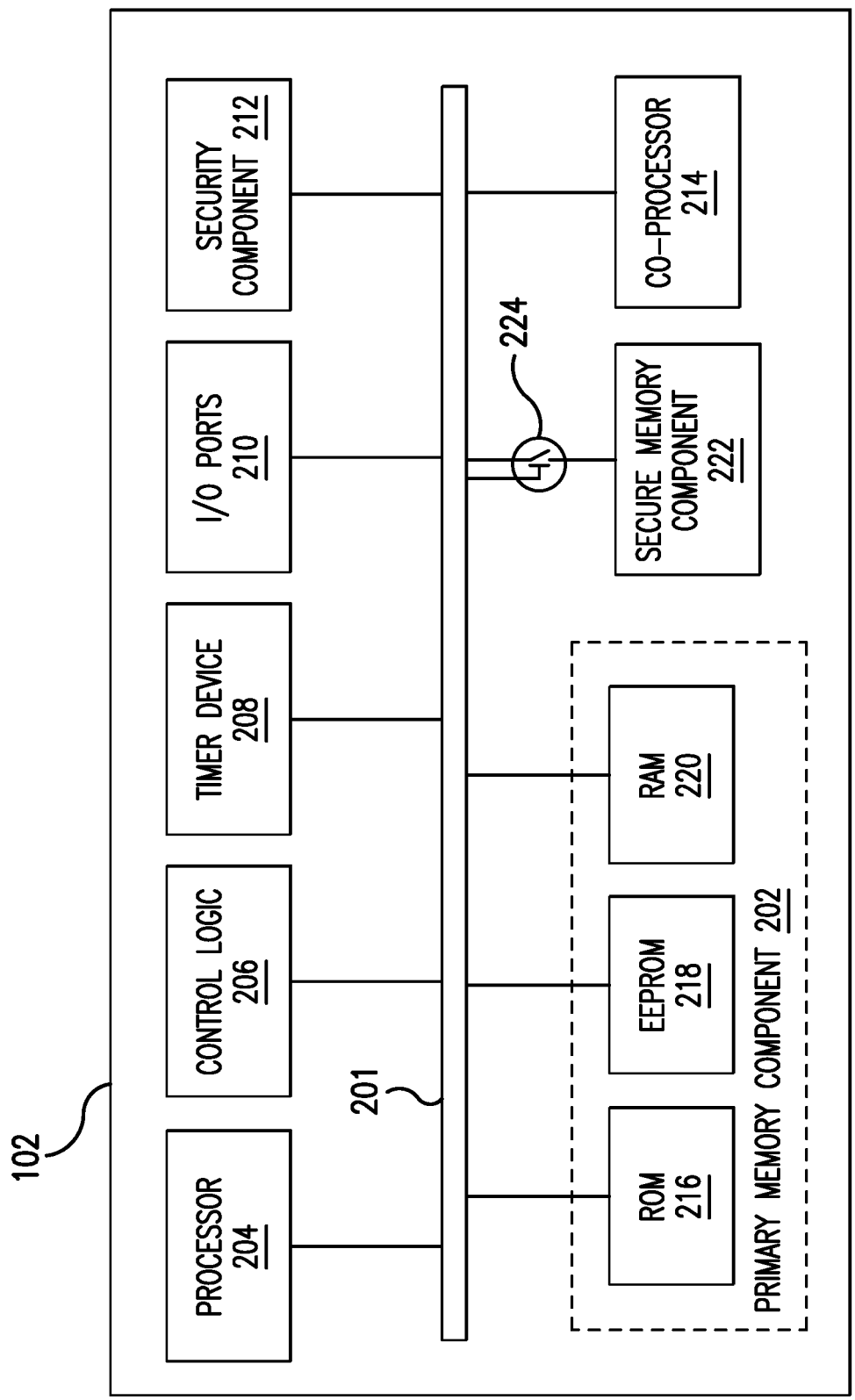
FIG. 2 is a block diagram of the micromodule of the secure element payment card shown in FIG. 1.

FIG. 2 is a block diagram of the micromodule 102. In the exemplary embodiment, the micromodule 102 includes a system bus 201 linking the primary memory component 202, the processor 204, control logic 206, a timer device 208, input/output ports 210, a security component 212, a co-processor 214, and the access-controlled secure memory component 222 together in communication. The control logic 206 is configured to operate in conjunction with the processor 204 to provide control for handling communications between the primary memory component 202 and the input/output ports 210. The timer device 208 facilitates providing a timing reference signal for the processor 204 and the control logic 206. The security component 212 preferably provides fusible links (not shown) that connect the input/output ports 210 to internal circuitry (not shown) for testing during manufacturing. The fusible links (not shown) are subsequently broken after completion of testing to facilitate limiting access to sensitive circuit areas. The co-processor 214 is configured to perform complex computations in real time, such as those required by cryptographic algorithms.

The secure memory component 222 is coupled to the system bus via an electronic switch 224. The electronic switch 224 includes, for example, a transistor, a logic gate, a MOSFET, thyristor, and/or any other type of electronic switch that enables the micromodule 102 to function as described herein. The electronic switch 224 limits access to the secure memory component 222 by opening and closing a circuit coupled to secure memory component 222 unless certain requirements are met, as described further herein. The electronic switch 224 is actuated by at least one of the processor 204 and/or the co-processor 214 determining that the certain requirements are met, thereby closing the circuit and enabling access to secure or encrypted data store thereon. In the exemplary embodiment, the secure memory component 222 includes, for example, non-volatile, programmable memory that can be updated, as described herein.

The primary memory component 202 may include different types of memory, such as volatile and non-volatile memory, and read-only and programmable memory. For example, as shown in FIG. 2, the primary memory component 202 may include read-only memory (ROM) 216, electrically erasable programmable read-only memory (EEPROM) 218, and random-access memory (RAM) 220.

Figure 3:
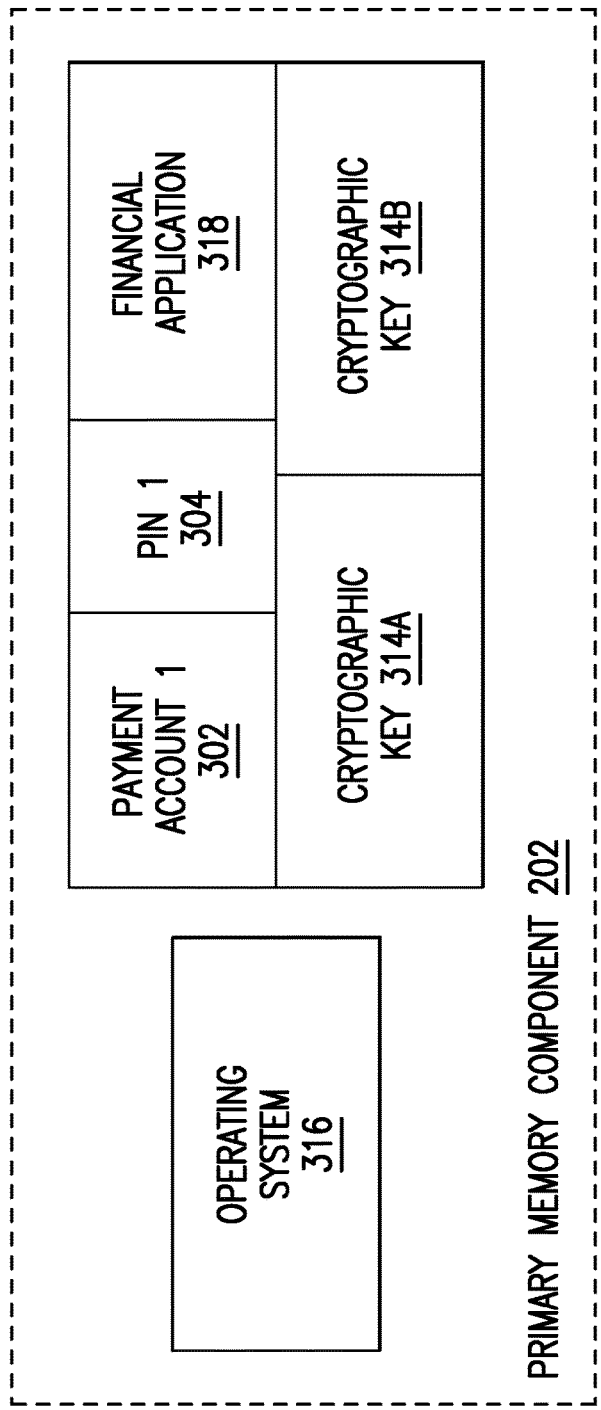
FIG. 3 is a data diagram of a primary memory component of the micromodule shown in FIG. 2.

FIG. 3 is a data diagram of the primary memory component 202. In the exemplary embodiment, the primary memory component 202 stores unique transaction data such as payment account data 302 linked to a funding source. In addition, the primary memory component 202 stores unique PIN data 304 corresponding to the payment account data 302. The unique PIN data 304 may be used to lock and unlock access to the payment account data 302 on the payment card 100. Furthermore, the payment card 100 includes one or more cryptographic keys 314A and 314B, which are strings of data (e.g., data bits) used by a cryptographic algorithm to transform plain text into cipher text and/or vice versa. The cryptographic keys 314A and 314B may be any type of known cryptographic keys generated by a cryptographic algorithm, such as private keys of public-key pairs. The cryptographic keys 314A and 314B are used for authentication of the payment card 100 and the transaction data (e.g., the account data 302, PIN data 304, etc.) stored in the micromodule 102. The unique PIN data 304 and the cryptographic keys 314A and 314B are preferably stored in a secure area of the ROM 216 or the EEPROM 218.

In the exemplary embodiment, the primary memory component 202 also stores an operating system 316 of the payment card 100 and a financial application 318. For example, the financial application 318 may be the Mastercard debit application that operates to process debit transactions on the Mastercard interchange network. The operating system 316 loads and executes the financial application 318 and provides file management and other basic card services to the financial application 318. In addition, the operating system 316 handles transmission of an answer-to-reset (ATR) message in response to a reset signal, as described further herein. In one embodiment, the operating system 316 is preferably stored in a secure area of ROM 216.

The financial application 318 may include program files and associated data files, which may be stored in the EEPROM 218. The financial application 318 may be written either in the native programming code of the processor 204 or it may be written in a higher-level language that must be translated before it is executed on the processor 204. The use of a higher-level language facilitates enabling the financial application 318 to execute or run on multiple hardware platforms without any need for re-writing.

Figure 4:
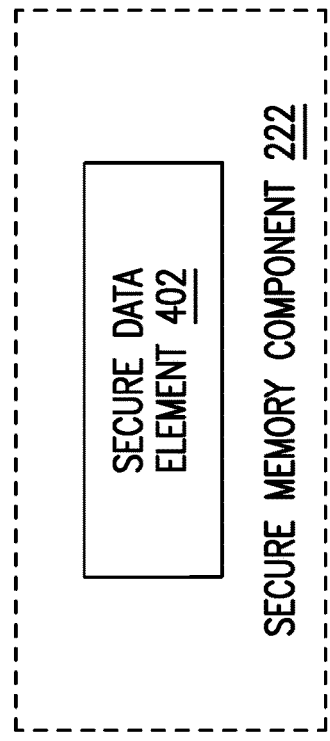
FIG. 4 is a data diagram of a secure memory component of the micromodule shown in FIG. 2

FIG. 4 is a data diagram of the secure memory component 222. In the exemplary embodiment, the secure memory component 222 stores unique authentication information/data such as a secure data element 402. In the exemplary embodiment, the secure data element 402 is user selectable and can be written to the payment card 100 when the card is generated for the customer and/or written/updated by the customer, for example at a POS terminal, ATM, or other electronic device capable of writing to the payment card 100. The secure data element 402 may be used to authenticate the payment card 100 and enable a transaction to proceed using the payment account data 302 (shown in FIG. 3).

Exemplary Payment Network

Figure 5:
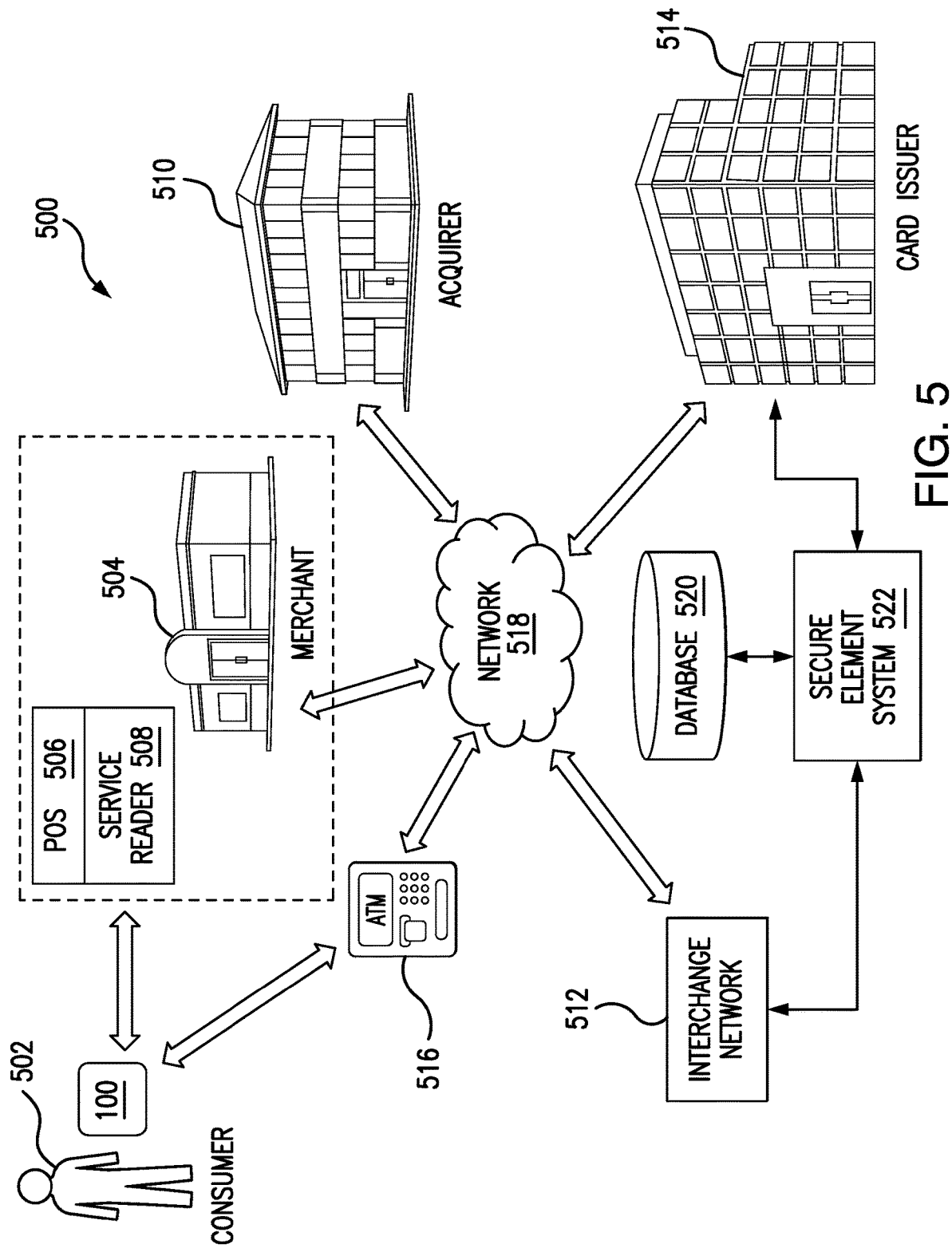
FIG. 5 is a block diagram of an exemplary payment card network system that may process the secure element payment card shown in FIG. 1.

FIG. 5 is a block diagram of an exemplary payment card network system 500. In the exemplary embodiment, the payment card network system 500 may be utilized, for example, by consumers and merchants as part of a process of performing transactions concurrent with delivery of goods and/or services. In addition, the payment card network system 500 is a payment card account system including the secure element payment card 100, which a cardholder 502 may use either to conduct electronic transactions and/or record payments for electronic transactions related to purchase of a merchant's goods and/or services.

The payment card network system 500 enables payment-by-card transactions in which merchants 504, acquirers 510, and/or card issuers 514 do not need to have a one-to-one relationship. Although parts of the payment card network system 500 are presented in one arrangement, other embodiments may include the same or different parts arranged otherwise, depending, for example, on authorization processes for purchase transactions, communication between computing devices, etc.

In the example embodiment, the payment card network system 500 generally includes the secure element payment card 100, merchants 504, acquirers 510, issuers 514, ATMs 516, and an interchange network 512 coupled in communication via a communications network 518. The communications network 518 includes, for example and without limitation, one or more of a local area network (LAN), a wide area network (WAN) (e.g., the Internet, etc.), a mobile network, a virtual network, and/or any other suitable public and/or private network capable of facilitating communication among the payment card 100, the merchants 504, the acquirers 510, the issuers 514, the ATMs 516, and/or the interchange network 512. In some embodiments, the communications network 518 may include more than one type of network, such as a private payment transaction network provided by the interchange network 512 to the acquirers 510, the issuers 514, and the ATMs 516, and, separately, the public Internet, which may facilitate communication between the payment card 100, the merchants 504, the interchange network 512, and the acquirers 510, etc.

Embodiments described herein may relate to a payment card system, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes at least one unique primary account number (PAN) associated with an account holder using a payment card issued by an issuer and purchase data representing a purchase made by the cardholder, including a type of merchant, amount of purchase, date of purchase, and other data, which may be transmitted between any parties of the payment card network system 500.

A financial institution called the "issuer" issues a payment card, such as a credit card or debit card, to a consumer such as the cardholder 502, who uses the payment card, such as the payment card 100, to tender payment for a purchase from the merchant 504. In the examplary embodiment, the payment card 100 includes a secure data element 402 (shown in FIG. 4) for authenticating the payment card 100. The cardholder 502 inputs information/data associated with the secure data element 402 for example, by visiting the ATM 516, a bank (e.g., the issuer 514), and/or via an online banking interface, and stores the information on the payment card 100, for example, in the secure memory component 222 (shown in FIG. 4). In addition, a copy of the secure data element is stored by one or more of the issuer 514 and the interchange network 512 in a database 520. The database 520 is associated with a secure element system 522.

The secure element system 522 may be a system of the issuer 514 or the interchange network 512. In certain embodiments, the issuer 514 may send a copy of the secure data element 402 to the interchange network 512, which may have a duplicate secure element system 522 configured therein.

The merchant 504 is typically associated with products, for example, and without limitation, goods and/or services, that are offered for sale and are sold to the cardholder 502. The merchant 504 includes, for example, a physical location and/or a virtual location such as an Internet-based storefront.

To accept payment from the cardholder 502, the merchant 504 establishes an account with a financial institution that is part of the payment card network system 500. This financial institution is typically called the "merchant bank," the "acquiring bank," or the acquirer 510. When the cardholder 502 submits payment for a purchase with the payment card 100, the merchant 504 requests authorization from the acquirer 510 for the purchase. The request may be performed over a telephone but is usually performed using the POS terminal 506 that reads the cardholder's account information from the micromodule 102 (shown in FIG. 1) and communicates electronically with the transaction processing computers of the acquirer 510. More specifically, the transaction data is transmitted to the merchant 504, for example, via a payment card reader 508 (broadly, a card acceptance device (CAD)) that is part of the POS terminal 506. The micromodule 102 stores more data than a magnetic stripe card and may be programmed to transmit governing rules for transactions and only relevant transaction data (e.g., selected payment account information). Known encryption techniques facilitate securing the transaction data and the processor facilitates the micromodule 102 being programmed for different transaction processes.

In the exemplary embodiment, the payment card 100 is inserted into the payment card reader 508 with a direct connection to the micromodule 102 on the surface of the payment card 100. The transmission of the transaction data (e.g., governing rules and/or payment account information) is via the physical contact points of the payment card reader 508 with the micromodule 102. Alternatively, in certain embodiments, the transmission of the transaction data (e.g., governing rules and/or payment account information) may be accomplished via wireless communication with the micromodule 102, such as with a contactless card (e.g., via Bluetooth communication, radio frequency (RF) communication, near field communication (NFC), and the like).

In some embodiments, the acquirer 510 may authorize a third party to perform transaction processing on its behalf In this case, the POS terminal 506 will be configured to communicate with the third party rather than the acquirer 510, as described above. Such a third party is usually called a "merchant processor," an "acquiring processor," or a "third party processor."

Using the interchange network 512, computers of the acquirer 510 or merchant processor will communicate with computers of the issuer 514 to determine whether the cardholder's account is in good standing and whether the purchase is covered by the cardholder's available credit line. Based on these determinations being positive, the issuer 514 transmits a card authentication message to the payment card 100, for example, via the POS terminal 506. Using the cryptographic keys 314A and/or 314B (shown in FIG. 3), the micromodule 102 decrypts the message and actuates the electronic switch 224 to read the secure data element 402. The POS terminal 506 transmits a card authentication response message to the issuer 514. If the secure data element 402 matches the copy stored by the issuer 514, an authorization code is issued to the merchant 504.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 504 to charge, or "capture," a transaction until the purchased goods are shipped or the purchased services are delivered. However, with respect to at least some debit card transactions, a charge may be posted at the time of the transaction. When the merchant 504 delivers the purchased products, the merchant 504 captures the transaction, for example, by appropriate data entry procedures on a point-of-sale terminal. This may include bundling of approved transactions daily for standard retail purchases. If the cardholder 502 cancels a transaction before it is captured, a "void" is generated. If the cardholder 502 returns goods after the transaction has been captured, a "credit" is generated. In some instances, if the cardholder 502 did not authorize the transaction, such as a previously cancelled recurring payment or a card-not-present account-on-file transaction, a "chargeback" is generated. The interchange network 512 and/or the issuer 514 stores the transaction card information, such as, and without limitation, a type of merchant, a merchant identifier, a location where the transaction was completed, an amount of purchase, and a date and time of the transaction, in a transaction database (not shown) associated with the interchange network 512 and/or the issuer 514 respectively.

After a purchase has been made, a clearing process occurs to transfer additional transaction data related to the purchase among the parties to the transaction, such as the acquirer 510, the issuer 514, and the interchange network 512. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 514, the cardholder's account is decreased. Normally, a charge is posted immediately to the cardholder's account. The interchange network 512 transmits the approval to the acquirer 510 for distribution of goods/services or information, or cash in the case of an ATM.

After a transaction is authorized and cleared, the transaction is settled among the merchant 504, the acquirer 510, and the issuer 514. Settlement refers to the transfer of financial data or funds among the merchant's account, the acquirer 510, and the issuer 514 related to the transaction. Usually, transactions are captured and accumulated into a "batch," which is settled as a group. More specifically, a transaction is typically settled between the issuer 514 and the interchange network 512, and then between the interchange network 512 and the acquirer 510, and then between the acquirer 510 and the merchant 504. It should be appreciated that more or less information related to transactions, as part of either authorization, clearing, and/or settling, may be included in the transaction data and stored within the transaction database, at the merchant 504, the acquirer 510, the payment network 512, and/or the issuer 514. Further, transaction data, unrelated to a particular payment account, may be collected by a variety of techniques, and similarly stored within the transaction database.

In some embodiments, the cardholder 502 involved in the transactions described herein may be prompted to agree to legal terms associated with their payment account, for example, during enrollment in such payment account, etc. As such, the cardholder 502 may voluntarily agree to allow the merchants 504, the issuers 514, the interchange network 512, etc., to utilize data collected during enrollment and/or collected relating to processing the transactions, subsequently for one or more of the purposes described herein.

Figure 6:
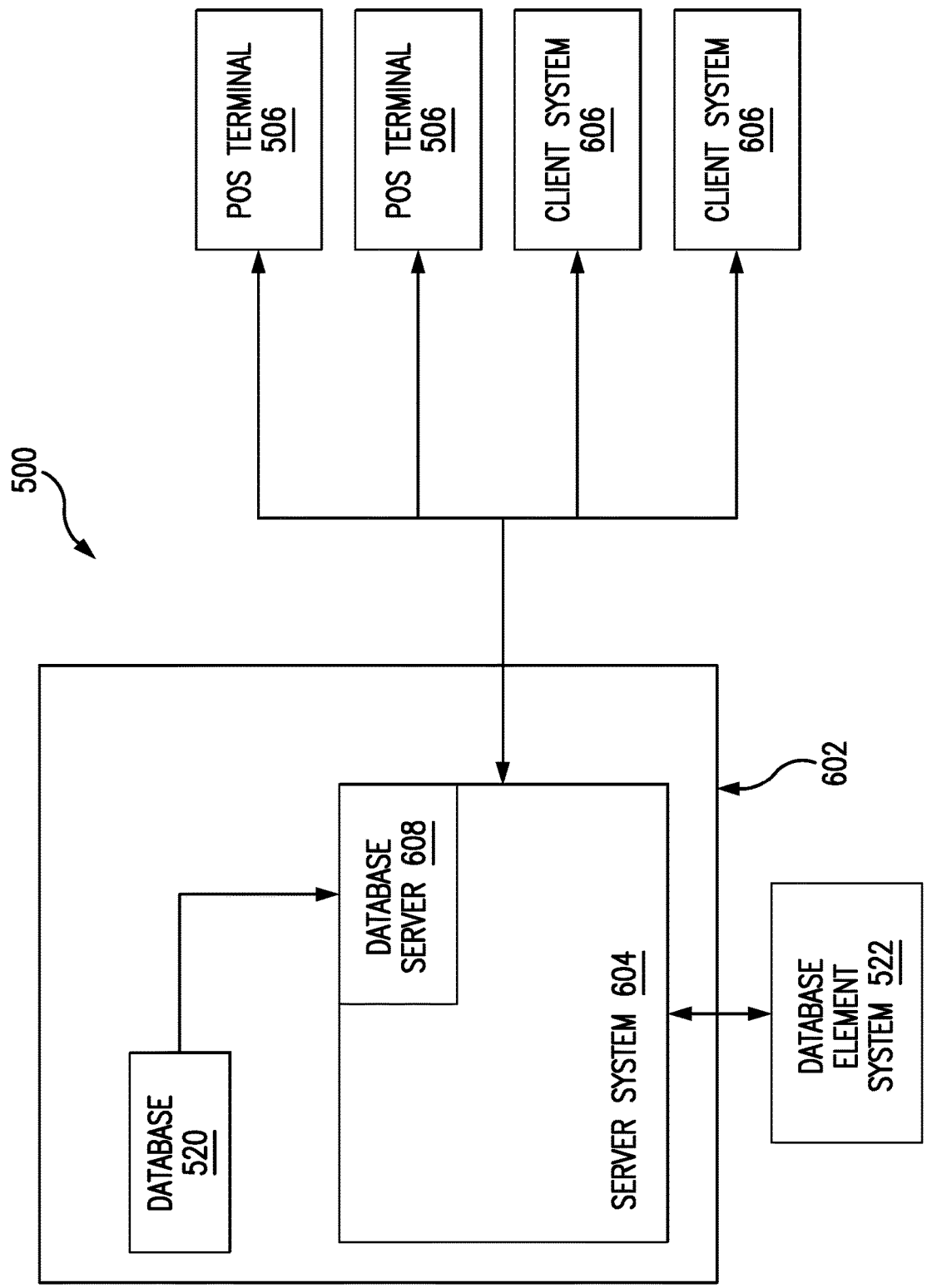
FIG. 6 is a simplified block diagram of an example payment card network system, such as the payment card network system shown in FIG. 5, including a plurality of computing devices and a server system.

FIG. 6 is a simplified block diagram of an example payment card network system, such as the payment card network system 500 (shown in FIG. 5), including a plurality of computing devices and the secure element system 522. In the example embodiment, the plurality of computing devices include, for example, a processing system 602 having a server system 604, POS terminals 506 located at merchants, such as the merchant 504 (shown in FIG. 5), and client systems 606 (e.g., ATMs 516, computers, etc.) associated with merchants, merchant banks, payment networks, and/or issuer banks (e.g., the issuer 514 (shown in FIG. 5)). In one embodiment, the payment card network system 500 implements a process for authenticating the payment card 100 using the secure element system 522.

More specifically, the secure element system 522 is in communication with the server system 604 and may be a component of the server system 604 or a separate computing device. The secure element system 522 is configured to receive and/or transmit card authentication messages and secure data, such as the secure data element 402 (shown in FIG. 4), related to a transaction card, such as the payment card 100. The secure data element 402 includes, for example, a user-selected test string, music file, digital image, and the like. The secure data element 402 is stored in the secure memory component 222 of the payment card 100 and/or a database, such as the database 520. In one embodiment, the secure data element 402 is received from one or more sources including, for example, a POS terminal 506, a client system 606, an ATM 516, and the like.

In the exemplary embodiment, as described above, the processing system 602 includes the server system 604 of, for example, the interchange network 512 (shown in FIG. 5), coupled in communication with the POS terminals 506, the client systems 606 (also includes client sub-systems), and the ATMs 516. In one embodiment, the client systems 606 and ATMs 516 are computers that include a user interface, such as a web browser, such that server system 604 is accessible to the client systems 606 and ATMs 516 using the Internet. The client systems 606 and ATMs 516 are interconnected to the Internet through one or more of many interfaces including, for example, a network, such as a LAN or WAN, dial-in-connections, cable modems, and/or special high-speed Integrated Services Digital Network (ISDN) lines. The client systems 606 and ATMs 516 are any computing device capable of interconnecting to the Internet, including an Internet connected phone, a PDA, or any other suitable web-based connectable equipment.

The POS terminals 506 may be connected to the client systems 606 or may be connected to the server system 604. The POS terminals 506 may be interconnected to the Internet (or any other network that allows the POS terminals 506 to communicate as described herein) through many interfaces including a network, such as a local area network (LAN) or a wide area network (WAN), dial-in-connections, cable modems, wireless modems, and special high-speed ISDN lines. The POS terminals 506 are any computing device capable of interconnecting to the Internet and including an input device capable of reading information from a consumer's financial payment card, such as the payment card 100. As used herein, the terms POS device, POS terminal, and point of interaction device are used broadly, generally, and interchangeably to refer to any computing device in which the cardholder 502 interacts with to complete a payment card transaction.

A database server 608 is connected to the database 520, which is configured to store information on a variety of matters, including secure data element data corresponding to the payment card 100, as is described herein in greater detail. In one embodiment, the database 520 is a centralized database stored on the server system 604 and can be accessed by potential users at one of the client systems 606 by logging onto the server system 604 through one of the client systems 606. In an alternative embodiment, the database 520 is stored remotely from the server system 604 and may be a distributed or non-centralized database.

In one example embodiment, the database 520 may include a single database having separated sections or partitions or may include multiple databases, each being separate from each other. The database 520 may store transaction data generated as part of sales activities and savings activities conducted over the processing network including data relating to merchants, account holders or customers, issuers, acquirers, savings amounts, savings account information, and/or purchases made. The database 520 may also store account data including at least one of a consumer name, a consumer address, an account number, and other account identifier data that relates the payment card 100 to the consumer, such as the cardholder 502. The database 520 may also store merchant data including a merchant identifier that identifies each merchant registered to use the network, and instructions for performing and settling transactions, including merchant bank account information. The database 520 may also store authorization request data, card authentication request data, and secure data element data.

In the exemplary embodiment, one of the client systems 606 may be associated with the acquirer 510 (shown in FIG. 5) while another one of the client systems 606 may be associated with the issuer 514 (shown in FIG. 5). The POS terminal 506 may be associated with the merchant 504 (shown in FIG. 5). The server system 604 may be associated with the interchange network 512 or another payment processor. In the example embodiment, the server system 604 is associated with a financial transaction processing network, such as the interchange network 512, and may be referred to as an interchange computer system. The server system 604 may be used for processing card authentication and transaction data. In addition, the client systems 606 and the POS terminals 506 may include a computer system associated with at least one of a merchant, an online bank, a bill payment outsourcer, an acquirer bank, an acquirer processor, an issuer bank associated with a payment card, an issuer processor, a remote payment processing system, a third-party aggregator, and/or a biller.

In the example embodiment, the processing system 602 is in communication with the secure element system 522, which may be associated with the interchange network 512, the issuer 514, or with an outside third party in a contractual relationship with the interchange network 512 and/or the issuer 514. In the example embodiment, the secure element system 522 processes card authentication requests and writes user-selected secure data elements to payment cards, such as the payment card 100. As such, the secure element system 522 is configured to provide various card authentication information to one or more parties involved in the card authentication request, such as the card issuer 514, the merchant 504, and the cardholder 502. It is noted that the payment card network system 500 may include more, fewer, or alternative components and/or perform more, fewer, or alternative actions, including those discussed elsewhere herein.

Exemplary Computer Systems

Figure 7:
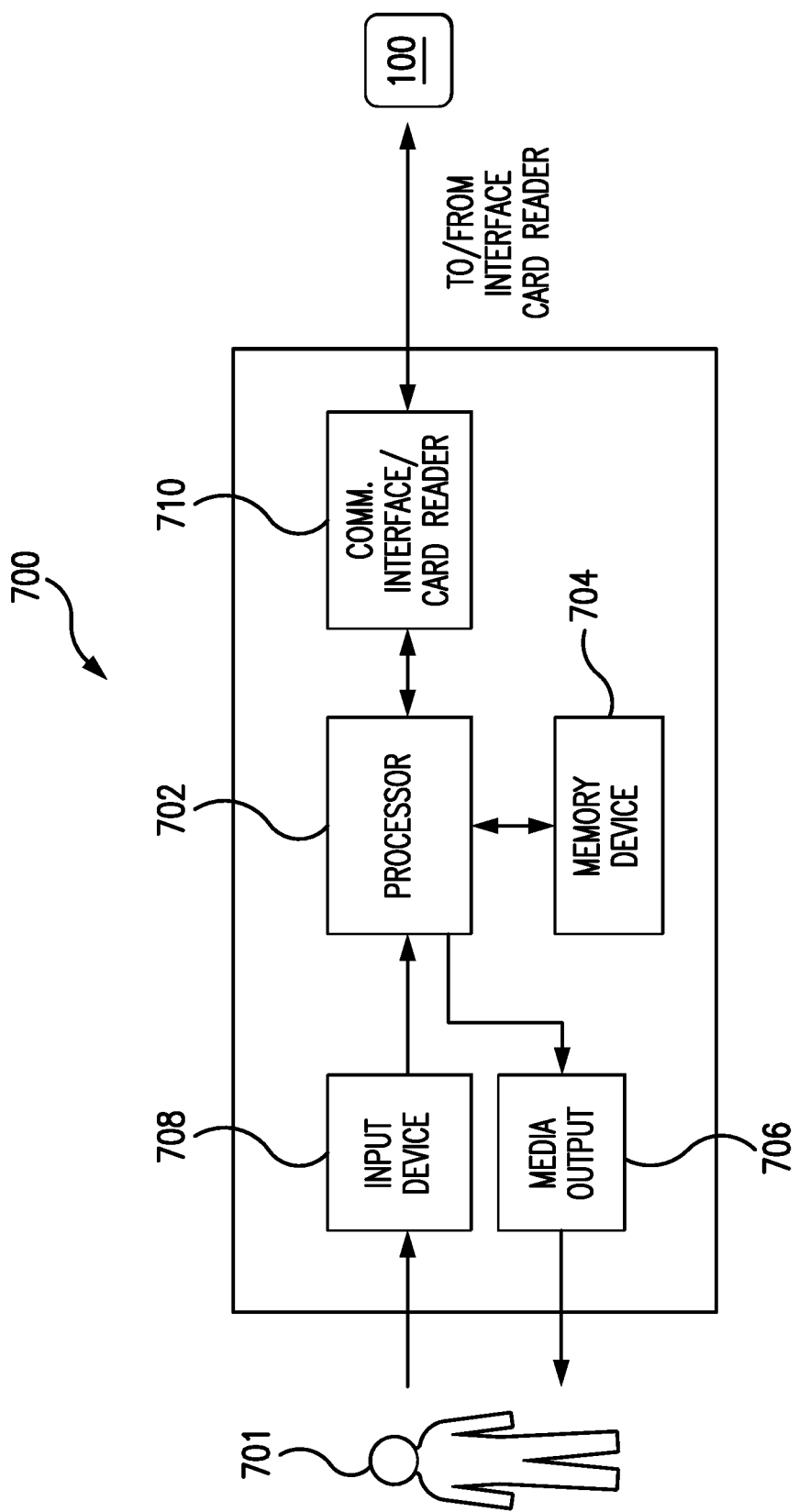
FIG. 7 is a block diagram illustrating an example of a computing device, such as one of the computing devices shown in FIG. 6.

FIG. 7 is an example configuration of a computing system 700 operated by a user 701, such as the cardholder 502 (shown in FIG. 5). In some embodiments, the computing system 700 is a merchant POS terminal 506, a client system 606, and/or an ATM 516. In the example embodiment, the computing system 700 includes a processor 702 for executing instructions. In some embodiments, executable instructions are stored in a memory device 704. The processor 702 includes one or more processing units, such as, a multi-core processor configuration. The memory device 704 is any device allowing information such as executable instructions and/or written works to be stored and retrieved. The memory device 704 includes one or more computer readable media.

In the example embodiment, the processor 702 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 700 may be widely deployed, it may be impractical to manually update software for each computing system 700. Therefore, the system 500 may, in some embodiments, provide a mechanism for automatically updating the software on the computing system 700. For example, an updating mechanism may be used to automatically update any number of components and their drivers, both network and non-network components, including system level (OS) software components. In some embodiments, the computing system components are dynamically loadable and unloadable; thus, they may be replaced in operation without having to reboot the OS.

The computing system 700 also includes at least one media output component 706 for presenting information to the user 701. The media output component 706 is any component capable of conveying information to the user 701. In some embodiments, the media output component 706 includes an output adapter such as a video adapter and/or an audio adapter. An output adapter is operatively coupled to the processor 702 and operatively connectable to an output device such as a display device, for example, and without limitation, a liquid crystal display (LCD), organic light emitting diode (OLED) display, or "electronic ink" display, or an audio output device such as a speaker or headphones.

In some embodiments, the computing system 700 includes an input device 708 for receiving input from the user 701. The input device 708 may include, for example, one or more of a touch sensitive panel, a touch pad, a touch screen, a stylus, a position detector, a keyboard, a pointing device, a mouse, and an audio input device. A single component such as a touch screen may function as both an output device of the media output component 706 and the input device 708.

The computing system 700 may also include a communication interface/card reader 710, which is communicatively connectable to a remote device such as the server system 604 (shown in FIG. 6) and/or the payment card 100. The communication interface/card reader 710 may include, for example, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 704 are, for example, computer readable instructions for providing a user interface to the user 701 via the media output component 706 and, optionally, receiving and processing input from the input device 708. A user interface may include, among other possibilities, a web browser and a client application. Web browsers enable users, such as the user 701, to display and interact with media and other information typically embedded on a web page or a website from the server system 604. A client application allows the user 701 to interact with a server application associated with a merchant.

Figure 8:
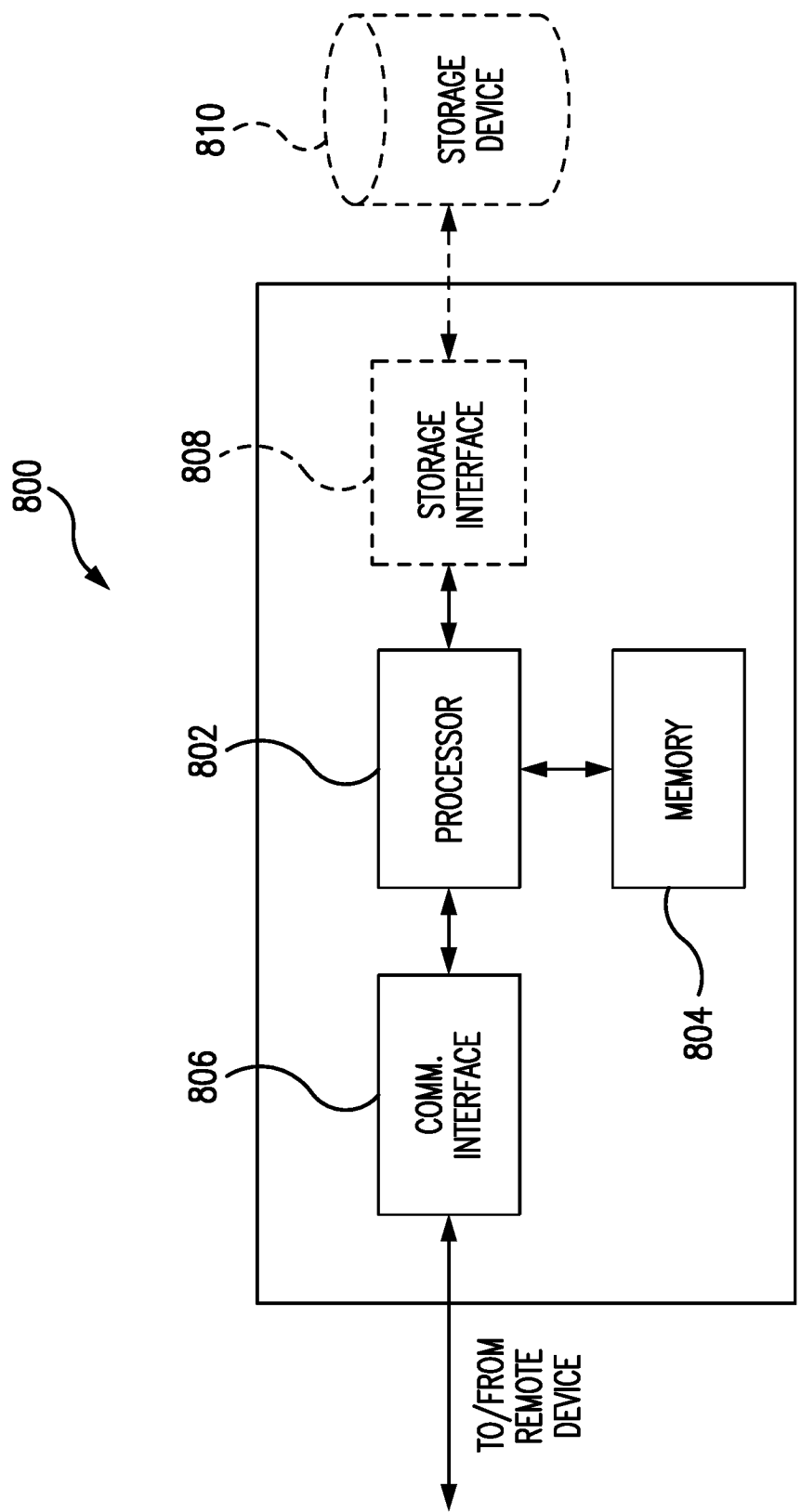
FIG. 8 is a block diagram illustrating an example server system, such as the server system shown in FIG. 6.

FIG. 8 is an example configuration of a server system 800, such as the server system 604 (shown in FIG. 6). The server system 800 includes, but is not limited to, the transaction database 520 (shown in FIGS. 5 and 6) and the secure element system 522 (shown in FIGS. 5 and 6). In the example embodiment, the server system 800 includes a processor 802 for executing instructions. The instructions may be stored in a memory area 804, for example. The processor 802 includes one or more processing units (e.g., in a multi-core configuration) for executing the instructions. The instructions may be executed within a variety of different operating systems on the server system 800, such as UNIX, LINUX, Microsoft Windows®, etc. More specifically, the instructions may cause various data manipulations on data stored in a storage device 810 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). In the example embodiment, the processor 802 may be implemented as one or more cryptographic processors, as described above with respect to the computing system 700.

The processor 802 is operatively coupled to a communication interface 806 such that the server system 800 can communicate with a remote device such as a computing system 700 (shown in FIG. 7) or another server system. For example, the communication interface 806 may receive communications from a POS terminal 506, a client system 606, and/or an ATM 516 via the network 518, as illustrated in FIG. 5.

The processor 802 is operatively coupled to the storage device 810. The storage device 810 is any computer-operated hardware suitable for storing and/or retrieving data. In some embodiments, the storage device 810 is integrated in the server system 800. In other embodiments, the storage device 810 is external to the server system 800 and is similar to the transaction database 520. For example, the server system 800 may include one or more hard disk drives as the storage device 810. In other embodiments, the storage device 810 is external to the server system 800 and may be accessed by a plurality of server systems. For example, the storage device 810 may include multiple storage units such as hard disks or solid-state disks in a redundant array of inexpensive disks (RAID) configuration. The storage device 810 may include a storage area network (SAN) and/or a network attached storage (NAS) system.

In some embodiments, the processor 802 is operatively coupled to the storage device 810 via a storage interface 808. The storage interface 808 is any component capable of providing the processor 802 with access to the storage device 810. The storage interface 808 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 802 with access to the storage device 810.

The memory area 804 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Generating the Secure Element Payment Card

Figure 9:
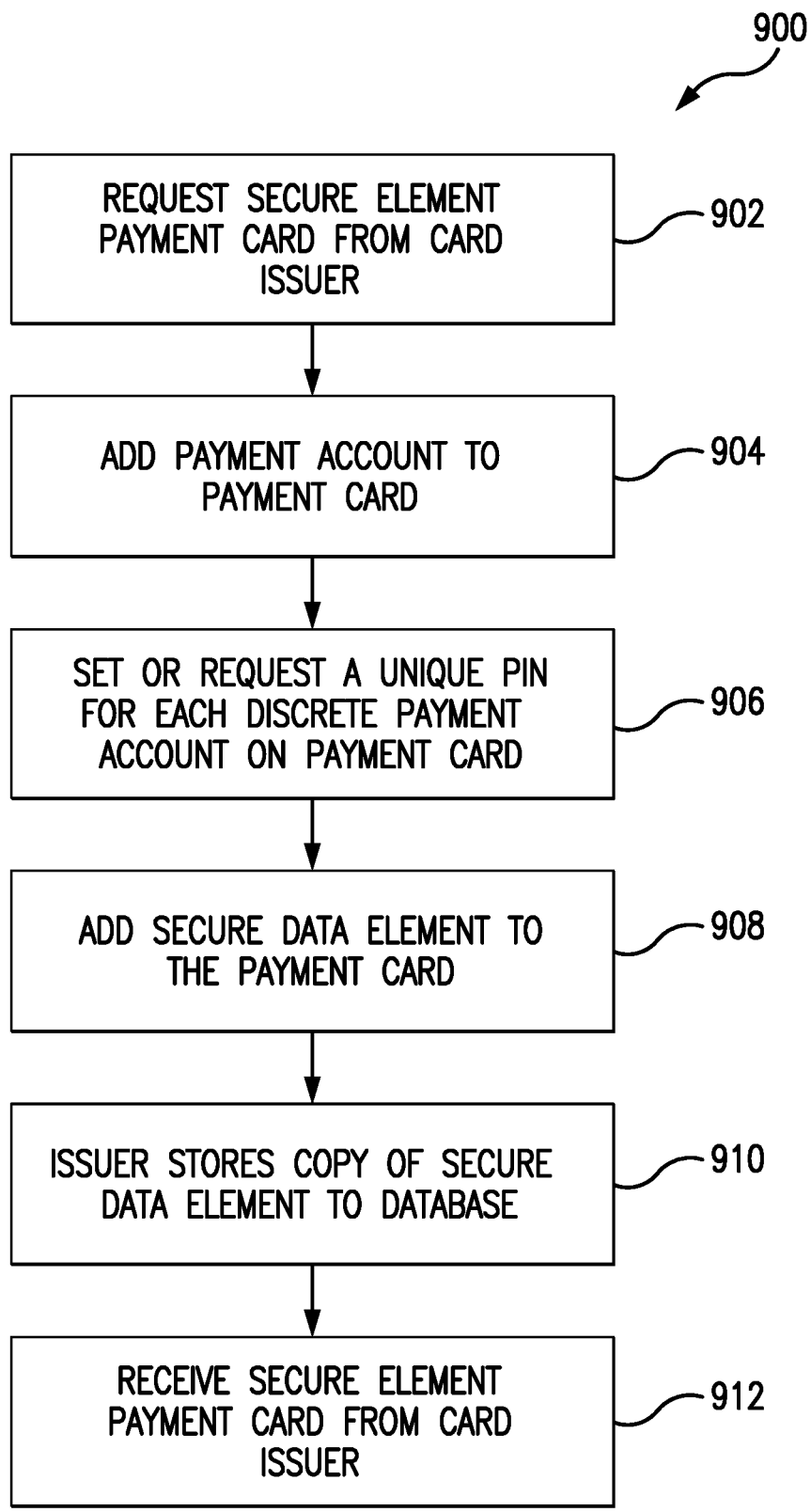
FIG. 9 is a flowchart illustrating a computer-implemented method for generating a secure element payment card, such as the secure element payment card shown in FIG. 1.

FIG. 9 is a flowchart illustrating an exemplary computer-implemented method 900 for generating a secure element payment card, such as the payment card 100. The operations described herein may be performed in the order shown in FIG. 9 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 900 is described below, for ease of reference, as being executed by exemplary devices and components introduced with the embodiments illustrated in FIGS. 1-8. In one embodiment, the method 900 may be implemented by an issuer, such as the issuer 514 (shown in FIG. 5). In the exemplary embodiment, the method 900 relates to the generation of the secure element payment card 100 (shown in FIG. 1). While operations within the method 900 are described below regarding the issuer 514, the method 900 may be implemented on other such computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

The computer-implemented method 900 facilitates a cardholder, such as the cardholder 502 (shown in FIG. 5), to request or register the payment card 100 with a card issuer. At an operation 902, the cardholder 502 requests a secure element payment card, such as payment card 100, from a card issuer, such as the issuer 514. The cardholder 502 may request the payment card 100, for example, using an online banking interface with the issuer 514, via an issuer telephone system, at an ATM (e.g., ATM 516), and/or any other banking application or system of the issuer that enables the cardholder to request the payment card 100 as described herein.

During the request, the cardholder 502 may add a payment account at operation 904, such as the payment account 302 (shown in FIG. 3), which is linked to a funding source. Various account data may be supplied to the issuer to facilitate adding a payment account to the payment card 100. For example, and without limitation, the cardholder may be asked to supply the payment account or card number (e.g., the PAN), the cardholder name on the account, the account expiration date, a card verification value (CVV) number, and/or any other discretionary issuer data.

At operation 906, the cardholder 502 may set (or request) a unique PIN number, such as the PIN 304, to be assigned to the payment account, such as the payment account 302, stored on the payment card 100. This facilitates providing a layer of security against unauthorized use of each distinct account stored on the payment card.

At operation 908, the cardholder 502 may add a secure data element, such as the secure data element 402 (shown in FIG. 4), to the payment card 100. Various secure data element data may be supplied to the issuer to facilitate adding the secure data element 402 to the payment card 100. For example, and without limitation, the cardholder 502 may be asked to supply a text string, a digital music file, a digital image file, and/or other discretionary data to be used as the secure data element 402. At operation 910, the issuer 514 stores a copy of the secure data element 402 in the database 520.

At operation 912, the cardholder 502 may receive the payment card 100 from the issuer 514 for use. Upon receipt of the payment card 100, the cardholder may activate the payment card 100 for use by verifying receipt and/or authenticating his or her identity with the card issuer 514, in any manner that is typical in the art. In the exemplary embodiment, the payment account and PIN data is stored in the primary memory component 202 of the payment card 100, whereas the secure data element is stored in the secure memory component 222.

Adding and/or Updating Secure Data Element

Figure 10:
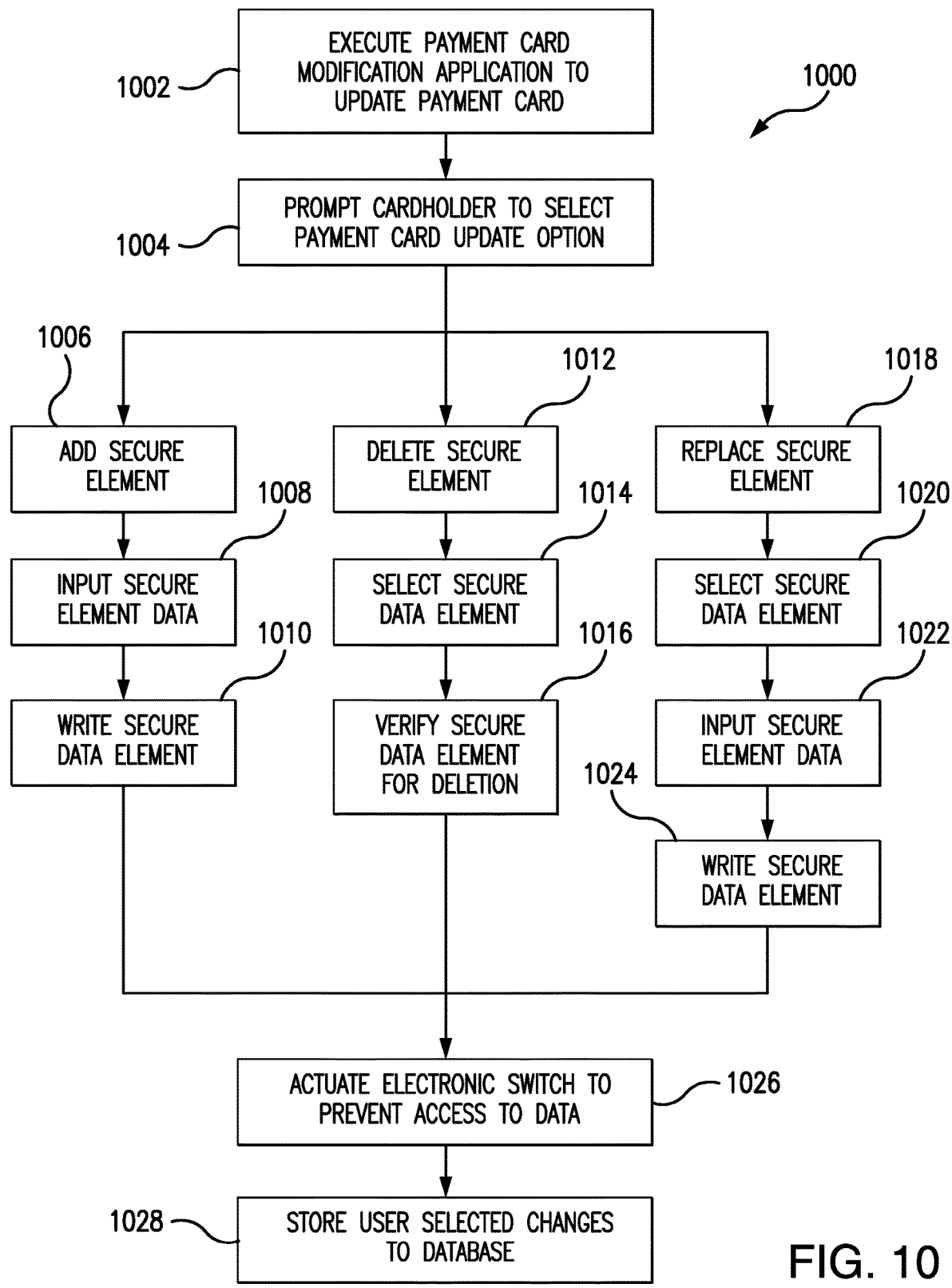
FIG. 10 is a flowchart illustrating a computer-implemented method for adding and/or updating the secure element payment card shown in FIG. 1.

FIG. 10 is a flowchart illustrating an exemplary computer-implemented method 1000 for adding and/or updating a secure data element stored on the payment card 100. The operations described herein may be performed in the order shown in FIG. 10 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1000 is described below, for ease of reference, as being executed by exemplary devices and components introduced with the embodiments illustrated in FIGS. 1-8. In one embodiment, the method 1000 may be implemented by a user, such as the cardholder 502 (shown in FIG. 5). In the exemplary embodiment, the method 1000 relates to the modification of the secure data element 402 stored on the payment card 100 (shown in FIG. 1). While operations within the method 1000 are described below regarding the cardholder 502, the method 1000 may be implemented by the issuer 514 (shown in FIG. 5) and/or on other such computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

The computer-implemented method 1000 facilitates a cardholder 502 adding and/or removing (broadly, updating) a secure data element to/from the payment card 100. The cardholder 502 may choose to update the payment card 100 in several ways, including, for example, having the card updated by the issuing bank at a physical bank, or updating the payment card personally by using, for example, an ATM or a POS terminal.

At operation 1002, in an embodiment using an ATM, after authenticating the cardholder 502, the cardholder 502 may update the payment card 100 by running a payment card modification application (e.g., an application on the ATM 516 (shown in FIG. 5)). The application may read the payment card 100, for example, using a payment card reader/writer, such as the card reader 508 (shown in FIG. 5), to load the card information into the application.

At operation 1004, a graphical user interface (GUI) of the application presents to or otherwise prompts the cardholder 502 to select an option for updating the payment card 100. For example, and without limitation, the GUI may present an Add Secure Element option 1006, Delete Secure Element option 1012, and a Replace Secure Element option 1018 to the cardholder 502.

When the cardholder 502 selects the Add Secure Element option 1006, at operation 1008, the cardholder 502 inputs data associated with the new secure data element to be added. The data may include, for example, and without limitation, a text string, a digital music file, a digital image file, and/or any other discretionary data chosen by the cardholder 502. For example, and without limitation, the cardholder 502 may upload the secure data element data to a computing system of the issuing bank at a physical bank location, or directly to the ATM or POS terminal. In certain embodiments, the cardholder 502 may connect to the ATM or POS terminal using his or her mobile device or data storage device (e.g., a USB drive, etc.) via an internet connection, a wireless connection (e.g., NFC, and the like), or via a wired connection for transmitting the secure data element data thereto. Furthermore, in other embodiments, the computing device of the issuing bank, the ATM, and/or the POS terminal may have preselected data elements of which the cardholder 502 may select from.

At operation 1010, the payment card modification application writes the new secure data element to the secure memory component 222 of the payment card 100. For example, and without limitation, the payment card modification application issues a command to the operating system 316 (shown in FIG. 3) to actuate (e.g., close) the electronic switch 224 (shown in FIG. 2), thereby closing the circuit and enabling the operating system to read/write to the secure memory component 222.

When the cardholder 502 selects the Delete Secure Element option 1012, at operation 1014, the cardholder 502 is presented with an identifier of the secure data element stored on the payment card 100 and selects secure data element, for example, by selecting a check box by the identifier. After selection of the secure data element for deletion, the cardholder 502 may be prompted to verify the selection at operation 1016 prior to the secure data element being deleted. This facilitates inadvertent deletion of the secure data element by the cardholder 502.

When the cardholder 502 selects the Replace Secure Element option 1018, at operation 1020, the cardholder 502 is presented with an identifier of the stored secure data element stored on the payment card 100. The cardholder selects the identifier and inputs data associated with a new secure data element, as described above, to replace the current secure data element at operation 1022. As described above, the new data may include, for example, and without limitation, a text string, a digital music file, a digital image file, and/or any other discretionary data chosen by the cardholder 502. At operation 1024, the payment card modification application writes the new secure data element to the secure memory component 222 of the payment card 100, as described above, replacing and/or overwriting any secure data element stored thereon.

At operation 1026, the payment card modification application issues a command to the operating system to actuate (e.g., open) the electronic switch 224, thereby preventing access to the secure memory component 222. At operation 1028, the payment card modification application writes the changes to the database 520. A card skimming device is prevented from reading the secure memory component 222, or even being aware that the secure memory component 222 is present on the payment card 100.

For example, when the payment card 100 is inserted into the ATM 516 and/or another payment card reader/writer 508 (e.g., a POS), the plurality of electrical contacts 104 of the micromodule 102 come into contact with corresponding contacts of the reader/writer device 508. Alternatively, wireless communications may be used with some payment cards to read/write data to and from the payment card. The reader/writer may then write the changes requested by the cardholder 502 to the payment card 100 wirelessly.

Figure 11A:
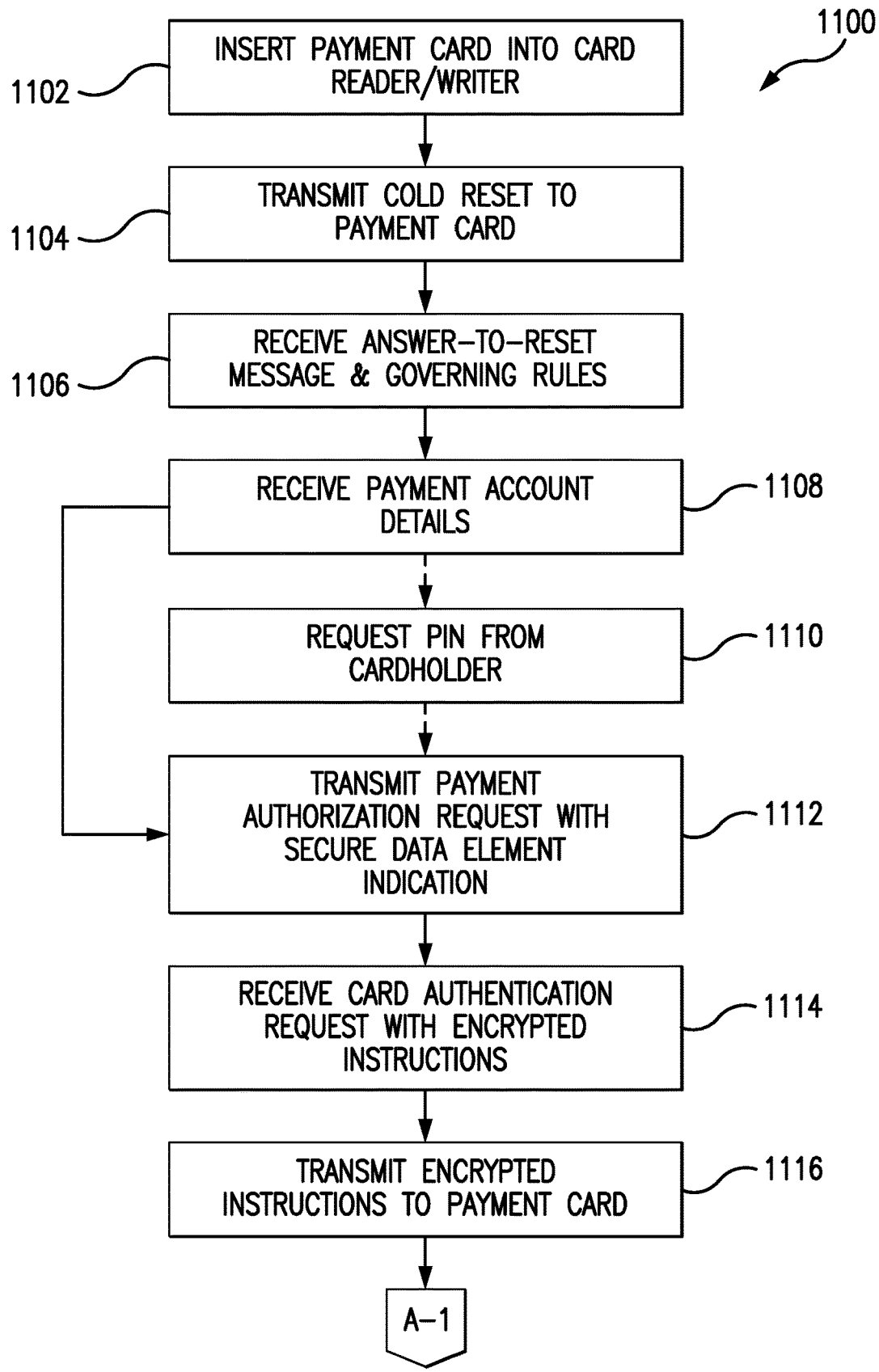
FIGS. 11A and 11B are flowcharts illustrating a computer-implemented method for authenticating a secure element payment card, such as the secure element payment card shown in FIG. 1.
Figure 11B:
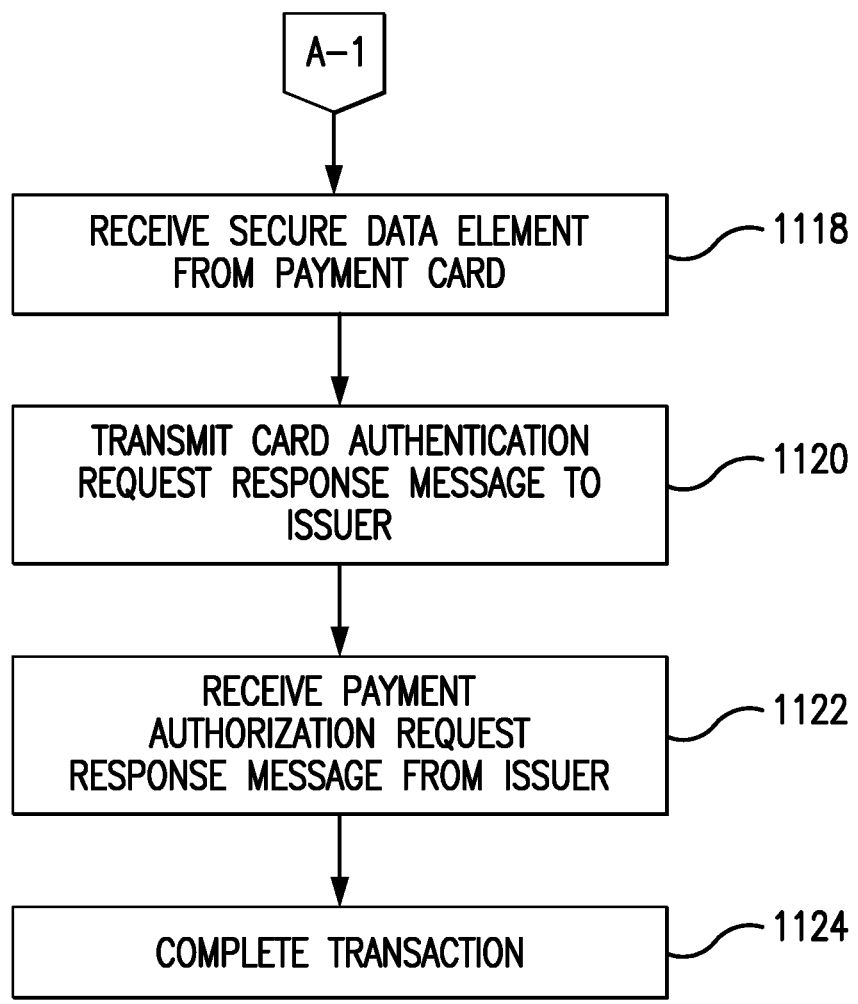

Exemplary Computer-Implemented Method for Authenticating a Secure Element Payment Card FIGS. 11A and 11B are flowcharts illustrating an exemplary computer-implemented method 1100 for authenticating a secure element payment card, for example, during a transaction. As described herein, an example transaction is performed using a secure element payment card, such as the payment card 100 (shown in FIG. 1). The operations described herein may be performed in the order shown in FIGS. 11A and 11B or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 1100 is described below, for ease of reference, as being executed by exemplary devices and components introduced with the embodiments illustrated in FIGS. 1-8. In one embodiment, the method 1100 may be implemented by a merchant, such as the merchant 504 (shown in FIG. 5). In the exemplary embodiment, the method 1100 relates to authenticating a secure element payment card during a transaction using the secure data element 402 stored on the payment card 100. While operations within the method 1100 are described below regarding the merchant 504, the method 1100 may be implemented by any other party to the transaction and/or on other such computing systems and/or devices through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

In an exemplary transaction, a cardholder, such as the cardholder 502 shown in FIG. 5, is shopping at a merchant, such as the merchant 504. The cardholder 502 is using the secure element payment card 100, which includes a payment account 302 and a secure data element 402. In the exemplary embodiment, after the cardholder 502 has selected an item to purchase, the cardholder proceeds to pay for the item.

At operation 1102, the cardholder 502 inserts the payment card 100 into the merchant POS terminal 506 (shown in FIG. 5). The card reader/writer 508 (shown in FIG. 5) reads the payment card 100. In particular, at operation 1104, the card reader/writer 508 transmits a cold reset signal to the micromodule 102 (shown in FIG. 1) of the payment card 100. This initial reset signal is a "cold reset" as defined by ISO/IEC 7816-3 standard and Part I of the EMV Integrated Circuit Card for Payment Systems Specification. For example, a cold reset is defined as a reset following the activation of the electrical contacts of a payment card (i.e., after the initial application of power and clock signals to the contacts), whereas a warm reset is defined as a reset following a cold reset while the power and clock signals are still applied to the payment card.

The payment card 100 responds with an Answer-to-Reset (ATR) message at operation 1106. The ATR message informs the POS terminal 506 of the governing rules for communication with and performing transactions using the payment card 100. For example, the governing rules include a rule that indicates that card authentication is required using a secure data element when authenticating the transaction. At operation 1108, the POS terminal 506 receives the payment account details of the payment account 302 from the payment card 100. In certain embodiment, at operation 1110, the POS terminal 506 requests the PIN 304 associated with the payment account 302.

In the exemplary embodiment, at operation 1112, the POS terminal 506 transmits a payment authorization request message including an indication that a secure data element is required. It is noted that the messages within an interchange network such the interchange network 512 (shown in FIG. 5), in at least some instances, conform to the International Organization for Standardization (ISO) Standard 8583, Financial transaction card originated messages—Interchange message specifications, which is the ISO standard for systems that exchange electronic transactions made by cardholders using payment cards. In the example embodiment, the payment authorization request message is an ISO 8583 message type identifier (MTI) "0100" message. The POS terminal 406 generates the payment authorization request message including, for example, data corresponding to a terminal ID, date of transaction, merchant location, the indication that a secure data element is required, and other discretionary data. The payment authorization request message is transmitted to the interchange network 512 for processing and further transmission to an issuing bank, such as the issuer 514 (shown in FIG. 5), for approval.

At operation 1114, a card authentication message is received from the issuer 514. The card authentication message includes an encrypted instruction, which at operation 1116 is transmitted to the payment card. when executed by the operating system 316 (shown in FIG. 3) of the payment card 100. The instructions cause the micromodule 102 to actuate the electronic switch 224, enabling access to the secure memory component 222. For example, using one or more of the cryptographic keys 314A and/or 314B (shown in FIG. 3), the micromodule 102 decrypts the card authentication message and actuates the electronic switch 224 as instructed.

At operation 1118, the POS terminal 506 receives the secure data element 402 from the payment card 100. In one embodiment, the secure data element 402 is encrypted using one of the cryptographic keys 314A and/or 314B. At operation 1120, the POS terminal 406 transmits a card authentication request response message to the issuer 514, including the secure data element 402 received from the payment card 100. Specifically, the POS terminal 406 generates the card authentication request response message including, for example, data corresponding to the terminal ID, date of transaction, merchant location, the secure data element 402, and other discretionary data. The issuer 514 extracts the secure data element 402, decrypting it if necessary, and compares the secure data element 402 to the copy of the secure data element stored in the database 520. If the two secure data elements match, the issuer approves the transaction.

At operation 1122, the POS terminal 506 receives a payment authorization request response message from the issuer 514 based on secure data element 402, for example, approving the transaction if the comparison described above indicates a match. In the example embodiment, the payment authorization request response message is an ISO 8583 message type identifier (MTI) "0110" message. At operation 1124, after receiving an "0110" payment authorization request response message approving the transaction, the merchant 504 completes the transaction. Otherwise, if the payment authorization request response message received from the issuer 514 indicates that the transaction request is declined, the merchant cancels the transaction.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

Additional Considerations

All terms used herein are to be broadly interpreted unless otherwise stated. For example, the term "payment card" and the like may, unless otherwise stated, broadly refer to substantially any suitable transaction card, such as a credit card, a debit card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A computer-implemented method to authenticate a secure element payment card, said method comprising:
   transmitting a cold reset signal to the secure element payment card;
   receiving an answer-to-reset message from the secure element payment card, the answer-to-reset message including governing rules for performing a transaction, the governing rules indicating that a secure data element is to be used to authenticate the secure element payment card;
   receiving payment account details for a payment account associated with the secure element payment card;
   transmitting a payment authorization request message to an interchange network;
   receiving a card authentication request message from the interchange network, the card authentication request message including an encrypted instruction;
   transmitting the encrypted instruction to the secure element payment card;
   receiving the secure data element from the secure element payment card;
   transmitting a card authentication request response message to the interchange network, the card authentication request response message including the secure data element; and
   receiving a payment authorization request response message, based on the secure data element, from the interchange network.

2. The computer-implemented method in accordance with claim 1, further comprising:
   receiving the secure element payment card at a point-of-sale device.

3. The computer-implemented method in accordance with claim 1, further comprising:
   generating the payment authorization request message, the payment authorization request message comprising an ISO 8583 message type identifier (MTI) "0100" message and including data indicating that the secure data element is to be used to authenticate the secure element payment card.

4. The computer-implemented method in accordance with claim 1, further comprising:
   receiving a PIN input by a cardholder, the PIN associated with the payment account.

5. The computer-implemented method in accordance with claim 1, further comprising:
   generating the card authentication request response message including data corresponding to the secure data element.

6. The computer-implemented method in accordance with claim 1, wherein the payment authorization request response message is an ISO 8583 message type identifier (MTI) "0110" message.

7. The computer-implemented method in accordance with claim 1, wherein the operation of receiving the secure data element from the secure element payment card comprises receiving the secure data element from a secure memory component of the secure element payment card, the encrypted instruction causing a processor of the secure element payment card to actuate an electronic switch to enable access to the secure memory component.

8. A system to authenticate a secure element payment card, said system comprising:

a secure element payment card having a micromodule comprising:
   a primary memory component storing payment account details for a payment account, a PIN associated with the payment account, and governing rules for performing a transaction, the governing rules indicating that a secure data element is to be used to authenticate the secure element payment card;
   a secure memory component storing the secure data element; and
   an electronic switch configured to open and close a circuit coupled to the secure memory component; and
a point-of-sale device comprising a processor and a payment card reader/writer component, said processor programmed to:
   transmit a cold reset signal to said micromodule of said secure element payment card;
   receive an answer-to-reset message from said micromodule, the answer-to-reset message including the governing rules;
   receive the payment account details for the payment account;
   transmit a payment authorization request message to an interchange network;
   receive a card authentication request message from the interchange network, the card authentication request message including an encrypted instruction;
   transmit the encrypted instruction to said micromodule;
   receive the secure data element from said micromodule;
   transmit a card authentication request response message to the interchange network, the card authentication request response message including the secure data element; and
   receive a payment authorization request response message, based on the secure data element, from the interchange network.

9. The system in accordance with claim 8,
said payment card reader/writer component configured to receive, from a cardholder, the secure element payment card.

10. The system in accordance with claim 8,
said processor further programmed to generate the payment authorization request message, the payment authorization request message comprising an ISO 8583 message type identifier (MTI) "0100" message and including data indicating that the secure data element is to be used to authenticate the secure element payment card.

11. The system in accordance with claim 8,
said processor further programmed to receive from a cardholder, via input into the point-of-sale device, the PIN.

12. The system in accordance with claim 8,
said processor further programmed to generate the card authentication request response message including data corresponding to the secure data element.

13. The system in accordance with claim 8, wherein the payment authorization request response message is an ISO 8583 message type identifier (MTI) "0110" message.

14. The system in accordance with claim 8, wherein, in receiving the secure data element from said micromodule, said processor of said point-of-sale device is programmed to receive the secure data element from said secure memory component of the secure element payment card, the encrypted instruction causing a processor of the secure element payment card to actuate said electronic switch to enable access to said secure memory component.

* * * * *